(12) United States Patent  
Pasternak

(10) Patent No.: US 8,433,727 B2
(45) Date of Patent: Apr. 30, 2013

(54) METHOD AND APPARATUS FOR RESTRICTING ACCESS TO WRITABLE PROPERTIES AT RUNTIME

(75) Inventor: Michael Pasternak, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 382 days.

(21) Appl. No.: 12/821,084

(22) Filed: Jun. 22, 2010

(65) Prior Publication Data

US 2011/0314243 A1    Dec. 22, 2011

(51) Int. Cl.
*G06F 17/30* (2006.01)
(52) U.S. Cl.
USPC .......................................................... 707/793
(58) Field of Classification Search .................. 707/781, 707/782, 783, 784, 785, 793
See application file for complete search history.

(56) References Cited

U.S. PATENT DOCUMENTS

| | | | |
|---|---|---|---|
| 6,487,552 B1* | 11/2002 | Lei et al. ................................. | 1/1 |
| 7,421,438 B2* | 9/2008 | Turski et al. ........................... | 1/1 |
| 7,707,621 B2* | 4/2010 | Walmsley .......................... | 726/2 |
| 7,747,640 B2* | 6/2010 | Dettinger et al. ............. | 707/766 |
| 2003/0200459 A1* | 10/2003 | Seeman ........................ | 713/200 |

* cited by examiner

*Primary Examiner* — Jorge A Casanova
(74) *Attorney, Agent, or Firm* — Lowenstein Sandler LLP

(57) ABSTRACT

A processing device executing an application receives a user command to update a specified writeable property of the application. The processing device determines whether the specified writeable property has metadata that distinguishes the specified writeable property as a user updateable property. In one embodiment, this is determined by using a reflection mechanism to examine metadata of the specified writeable property. In another embodiment, this is determined by examining a dynamic changeable properties list that was created and populated at runtime of the application. If the specified writeable property has the metadata that distinguishes the specified writeable property as a user updateable property, the processing device updates the specified writeable property in accordance with the user command.

20 Claims, 7 Drawing Sheets

US 8,433,727 B2

METHOD AND APPARATUS FOR RESTRICTING ACCESS TO WRITABLE PROPERTIES AT RUNTIME

TECHNICAL FIELD

Embodiments of the present invention relate to software applications and, more specifically, to dynamically determining what writeable properties of applications are user updatable at runtime.

BACKGROUND

In computer science, applications (also known as programs) include both static properties that cannot be modified and writeable properties that are changeable. However, many writeable properties should not be modified by users. This is especially true for applications such as services (e.g., business logic) provided by a web server or other application server. Conventionally, when a programmer writes an application, the programmer manually generates a changeable properties list for that application during programming. Writeable properties that have an entry in the changeable properties list can be modified by a user, while those properties that do not have an entry in the changeable properties list cannot be modified by a user. Whenever the application is updated (e.g., a new version of the application is written), the programmer must remember to manually update the changeable properties list to reflect newly added properties and/or changed functionality of existing properties. Therefore, it is not uncommon for a programmer to forget to add a property to the changeable properties list, or to remove a property from the changeable properties list that should not be updatable in a later software version.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
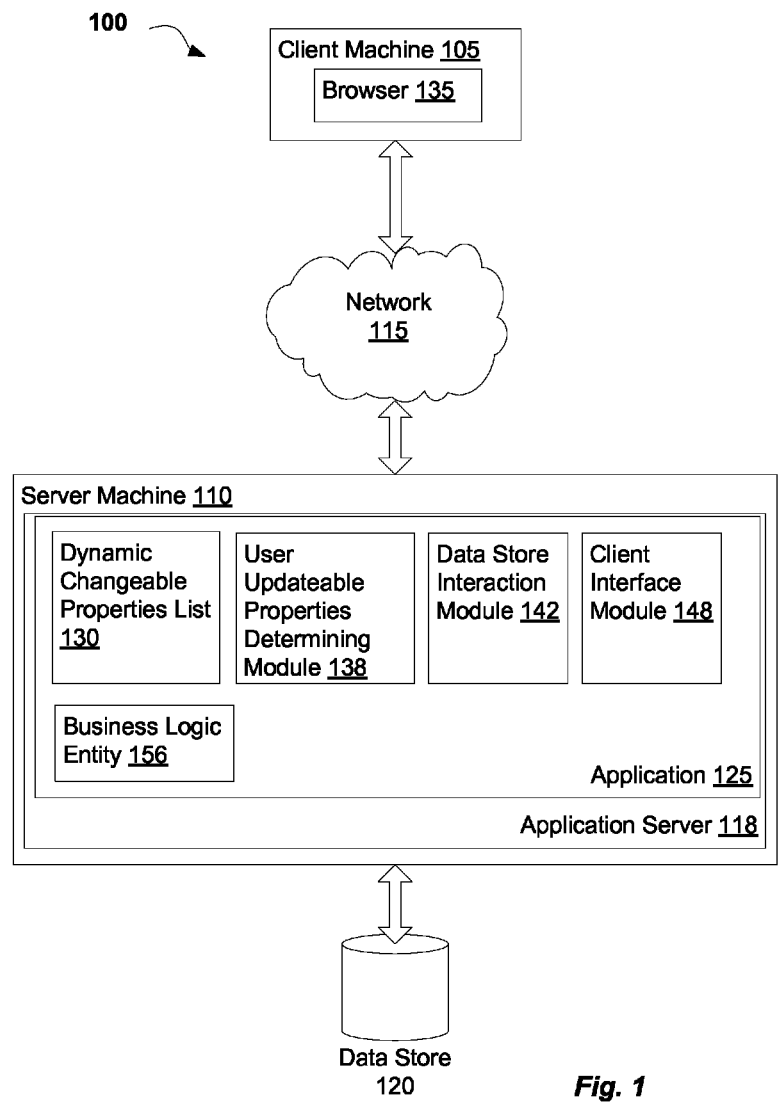
FIG. 1 is a block diagram of a network architecture, in which embodiments of the invention may operate.

Embodiments of the invention provide a mechanism for dynamically determining whether a writeable property is user updateable during runtime of an application. In one embodiment, a processing device initiates execution of an application. During runtime of the application, the processing device identifies writeable properties of the application or of a business logic entity associated with the application. For each writeable property, the processing device examines metadata associated with the writeable property. The processing device determines whether the writeable property is a user updatable property based on the metadata. An entry is added to a dynamic changeable properties list for each writeable property that is a user updatable property. The dynamic changeable properties list may then be used to determine whether specific writeable properties are user updateable. In another embodiment, upon receiving a user command to update a specified writeable property, an application scans itself or a business logic entity to determine whether the specified writeable property has metadata that distinguishes the specified writeable property as a user updateable property.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "receiving", "initiating", "examining", "adding", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium (also referred to as a computer readable medium) includes any mechanism for storing information in a form readable by a machine (e.g., a computer). For example, a machine-readable (e.g., computer-readable) medium includes a machine readable storage medium such as a read only memory ("ROM"), random access memory ("RAM"), magnetic disk storage media, optical storage media, flash memory devices, etc.

FIG. 1 is a block diagram of a network architecture 100, in which embodiments of the invention may operate. The network architecture 100 includes a client machine 105 connected to a server machine 110 over a network 115. Network 115 may be a private network (e.g., a local area network (LAN), a wide area network (WAN), etc.) or a public network (e.g., the Internet), and may be a combination of one or more networks.

Client machine 105 may be a computing device such as, for example, a desktop computer, laptop computer, server, cellular phone, personal digital assistant (PDA), etc. In one embodiment, client machine 105 includes a browser 135 that enables client machine 105 to access information maintained by, and use services provided by, server machine 110. Browser 135 is an application that enables client machine 105 to display and interact with text, images, and other information provided by server machine 110. The browser 135 may be a web browser configured to display web pages (e.g., by using hypertext transfer protocol (HTTP), extended markup language (XML), javascript, etc.). In an alternative embodiment, client machine 105 initiates service requests without use of browser 135.

Server machine 110 includes an application server 118 that provides one or more services (e.g., database services, systems management services, network monitoring services, transactional services, webpage viewing services, etc.) to client machine 105. The application server 118 may be a front end server (e.g., that provides an interface to client machine 105) and/or a back end server. Application server 118 includes an application 125, which may be business logic that provides services and/or information to client machine 105. Such services may include, for example, online retail sales, webmail, online auctions, discussion boards, web logs (blogs), etc. In one embodiment, application server 118 is a web application server (e.g., a .NET web server), and application 125 is a web application.

In one embodiment, application server 118 and application 125 operate within a software framework such as the .NET framework provided by Microsoft® Corporation. Another example of a software framework is the Java® platform. The .NET framework includes a library of coded solutions to common programming concerns and functionality, and a virtual machine that manages the execution of programs written to operate within the .NET framework. Applications written for the .NET framework execute in a software environment that manages the application's runtime requirements. The .NET framework includes a reflection mechanism in its library of functionality, which may be implemented by a user updateable property determining module 138 of application 125. Reflection is a process by which a computer program (e.g., application 125) may observe and modify its own structure and behavior during runtime. Other software frameworks such as the Java platform also include reflection mechanisms, a software environment that manages an application's runtime requirements, etc. Additionally, the user updateable properties determining module 138 may include its own reflection functionality that is separate from the reflection mechanism provided by the software framework.

Application server 118 and/or application 125 may receive a command from client machine 105 (e.g., from browser 135). The received command may be a user command to update/change a writeable property of the application 125. In one embodiment, a client interface module 148 of application 125 receives the commands. The client interface module 148 may be responsible for sending data to clients 105 and receiving commands from clients 105. The client interface module 148 passes on the command to user updateable properties determining module 138. In one embodiment, the user updateable properties determining module 138 scans application 125 to determine whether the specified writeable property is user updateable (e.g., using reflection). In another embodiment, user updateable properties determining module 138 checks a dynamic changeable properties list 130 to determine whether the specified writeable property is user updateable. In one embodiment, the user updateable properties determining module 138 creates and populates the dynamic changeable properties list 130 at runtime of the application 125.

If the received user command is a command to change a writeable property that is a user updateable property (e.g., a writeable property that is in the dynamic changeable properties list 130), the writeable property is updated. In one embodiment, the application 125 updates the writeable property based on the received command. Updating the writeable property may include replacing a current value of the writeable property with a new value for the writeable property. If the received user command is a command to change a writeable property that does not have an entry on the dynamic changeable properties list (or does not have an entry that distinguishes the writeable property as a user updateable property), then the writeable property is not changed.

In one embodiment, server machine 110 is coupled with a data store 120, which may be a file, a database, a repository, or any other data structure(s) residing on one or more electronic devices, such as main memory, or on one or more mass storage devices, such as magnetic or optical storage based disks, tapes or hard drives. The data store 120 stores values of writeable properties of application 125 and/or application server 118. In one embodiment, application 125 includes a data store interaction module 142, which writes data to, and reads data from, data store 120. When application 125 changes a value of a writeable property, data store interaction module 142 may update an entry corresponding to that writeable property in the data store 120.

Note that application server 118 may include its own dynamic changeable properties list (not shown), user updateable properties determining module (not shown), data store interaction module (not shown) and/or client interface module (not shown). Additionally, user commands may be commands directed to the application server 118 to update a writeable property of the application server 118. In such an instance, application server 118 may update the indicated writeable property if that writeable property is in the application server's 118 dynamic changeable properties list, or otherwise determined to be a user updateable property. Some embodiments for creating and managing dynamic changeable properties lists 130 and for dynamically determining whether a writeable property is a user updateable property are discussed in more detail below with reference to FIGS. 2A-5.

In one embodiment, the application 125 includes a business logic entity 156. The business logic entity is a data structure that contains specific data or performs specific functions related to business logic. An example of a business logic entity is a virtual machine. The business logic entity 156 may be a component of the application 125, or may be external to, but managed by, the application 125. The business logic entity 156 includes one or more writeable properties. In one embodiment, user updateable properties determining module 138 scans the business logic entity 156 to identify which writeable properties of the business logic entity 156 are user updateable properties. User updateable properties determining module 138 may generate the dynamic changeable properties list 130 for the business entity 156 based on user updateable properties of the business logic entity 156.

Figure 2A:
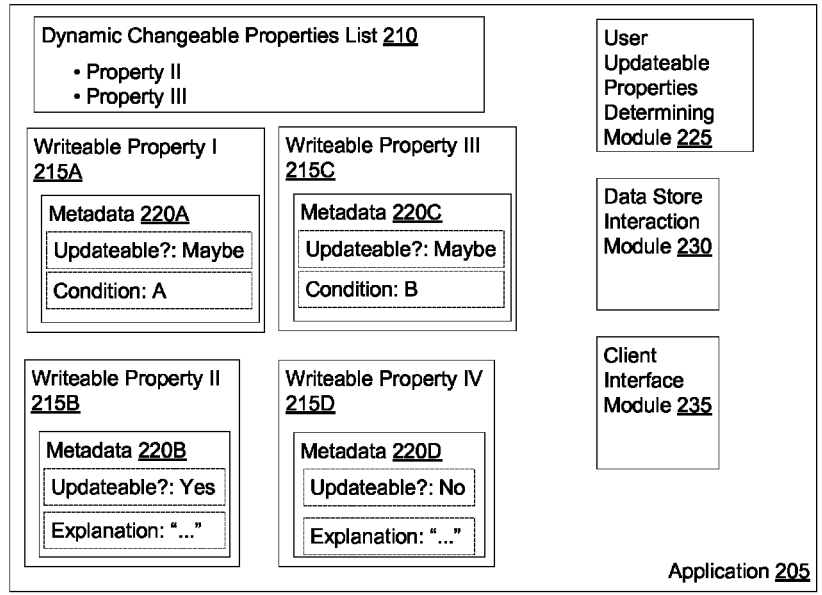
FIG. 2A is a block diagram of an example application having a dynamic changeable properties list, in accordance with one embodiment of the present invention.
Figure 2B:
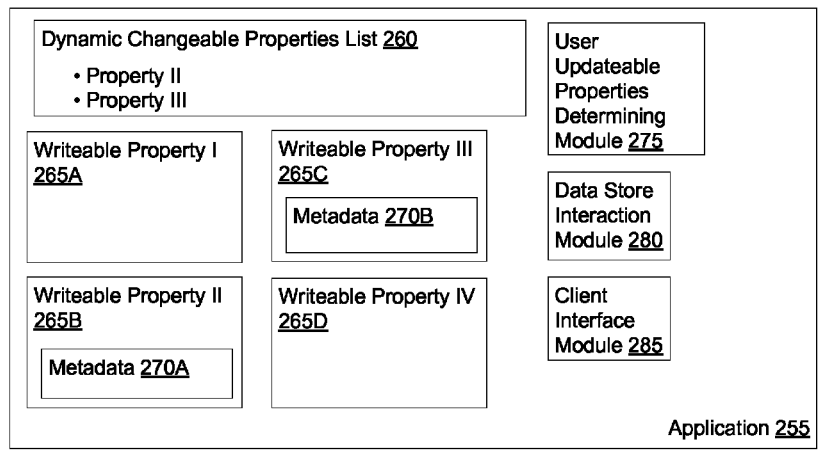
FIG. 2B is a block diagram of another example application having a dynamic changeable properties list, in accordance with one embodiment of the present invention.

FIGS. 2A-2B are block diagrams of example applications 205, 255 having dynamic changeable properties lists. The applications 205, 255 may correspond to application 125 and/or application server 118 of FIG. 1. Alternatively, applications 205, 255 may be local applications that run on a computing device such as client machine 110 of FIG. 1.

Referring to FIG. 2A, application 205 includes multiple writeable properties 215. In the illustrated example, the writeable properties 215 include writeable property I 215A, writeable property II 215B, writeable property III 215C and writeable property IV 215D. However, application 205 may include greater or fewer writeable properties. Examples of writeable properties include an application's identifier, an application's name, an application's host name, an application's importance, or any other property that a developer determines should be writeable.

Each of the writeable properties 215 may include metadata 220. The metadata 220 identifies whether or not an associated writeable property 215 is also a user updateable property. In one embodiment, the metadata 220 is a custom attribute, such as a custom attribute of the .NET framework. In one embodiment, the metadata 220 has a first state if it indicates that the associated writeable property is user updateable and a second state if it indicates that the associated writeable property is not user updateable. For example, metadata 220A indicates that writeable property I 215D is not user updateable, while metadata 220B indicates that writeable property II 215B is user updateable.

In one embodiment, some metadata 220 identifies that a writeable property is user updateable only under specified conditions (that the writeable property is conditionally updateable). These specific conditions may be the specific conditions that exist at the time that a user attempts to modify the writeable property, or may be conditions that exist at the time that the dynamic changeable properties 210 list was generated. In one embodiment, some metadata 220 includes a condition field that identifies under which conditions the writeable property is user updateable. For example, metadata 220A is user updateable when condition A is satisfied, while metadata 220C is user updateable when condition B is satisfied.

In one embodiment, some metadata 220 identifies a reason why a writeable property is user updateable or why a writeable property is not user updateable. For example, metadata 220B includes an explanation field that identifies why writeable property II 215B is user updateable and metadata 220D includes an explanation field that identifies why writeable property IV 215D is not user updateable. The explanation field may be used, for example, to provide a specific error message to a user that attempts to modify a writeable property that is not user updateable. In one embodiment, the contents of the explanation field are returned to the user when the user attempts to modify the writeable property that contains the explanation field.

In one embodiment, application 205 includes a user updateable properties determining module 225, a data store interaction module 230 and a client interface module 225. Client interface module 235 interfaces with clients by sending messages to, and receiving messages from, the clients. In one embodiment, client interface module 235 is a component of a representation layer of the application 205. The representation layer may also include, for example, a graphic user interface or a command line interface. Data store interaction module 230 interfaces with a data store, which includes writing data to, and reading data from, the data store.

In one embodiment, data store interaction module 230 is a component of a data access layer of application 205. User updateable properties determining module 225 determines which writeable properties of application 205 are user updateable properties. Techniques for making such a determination are discussed in greater below with reference to FIGS. 3-5. In one embodiment, user updateable properties determining module 225 is a component of a middle layer of application 205. The middle layer is responsible for ensuring that all business rules associated with the application 205 are satisfied. One such business rule, managed by user updateable properties determining module 225, specifies which writeable properties should be user updateable.

In one embodiment, during runtime of application 205, the user updateable properties determining module 225 creates a dynamic changeable properties list 210. An empty dynamic changeable properties list may initially be created. The user updateable properties determining module 225 may then add an entry to the dynamic changeable properties list 210 for each writeable property 215 that has metadata indicating that it is user updateable. In one embodiment, entries are also added to the list for properties that are not user updateable. Such entries include an identifier that characterize the associated writeable properties as not being user updateable. In a further embodiment, the entries for writeable properties that are not user updateable include data from an explanation field of the metadata. Thus, when an entry for a writeable property in the dynamic changeable properties list 210 indicates that the writeable property is not user updateable, the data from the explanation field may be returned to a user to notify the user why the writeable property is not user updateable.

In one embodiment, a reflection mechanism (e.g., the .Net framework reflection mechanism) is used by the user updateable properties determining module 225 to scan the application to determine which writeable properties are user updateable. In one embodiment, a software framework's reflection mechanism is used to read all of the metadata associated with writeable properties to determine which writeable properties are user updateable. For example, the "System.Reflection.MemberInfo.GetCustomAttributes" and/or "System.Reflection.Assembly.GetCustomAttributes" methods of the .NET framework may be used to query the existence and/or values of the metadata 220, which may be a .NET custom attribute. In another embodiment, the user updateable properties determining module 225 includes its own reflection capability that is distinct from the reflection mechanism included in the library of the software framework within which the application 205 runs.

Referring to FIG. 2B, application 255 also includes multiple writeable properties 265, a user updateable properties determining module 275, a data store interaction module 280 and a client interface module 285. Some of the writeable properties 265 include metadata 270 that identifies that an associated writeable property 265 is also a user updateable property. In one embodiment, the presence of the metadata 270 indicates that an associated writeable property is user updateable, while a lack of the metadata 270 indicates that a writeable property is not user updateable. In one embodiment, the metadata 270 is a custom attribute, such as a custom attribute of the .NET framework. For example, writeable property II 265B includes metadata 270A, and is therefore user updateable, and writeable property III 265C includes metadata 270B, and is therefore also user updateable. However, writeable property I 265A and writeable property IV 265D do not include the metadata, and therefore are not user updateable.

During runtime of the application 255, the user updateable properties determining module 275 may create a dynamic changeable properties list 260. The user updateable properties determining module 275 may then add an entry to the dynamic changeable properties list 260 for each writeable property 265 that has metadata indicating that it is user updateable. In one embodiment, the user updateable properties determining module 275 determines which properties have metadata indicating that they are user updateable properties using a reflection mechanism such as the .NET framework's reflection mechanism, the Java platform's reflection mechanism, or a distinct reflection functionality coded into the user updateable properties determining module 225.

The dynamic changeable properties list has been heretofore described as being associated with a particular application. However, dynamic changeable properties lists may also be generated for specific business logic entities. The business logic entities may be components of an application, or may be objects (data structures) that are usable by an application or by multiple different applications. One example of a business logic entity is a virtual machine.

Figure 2C:
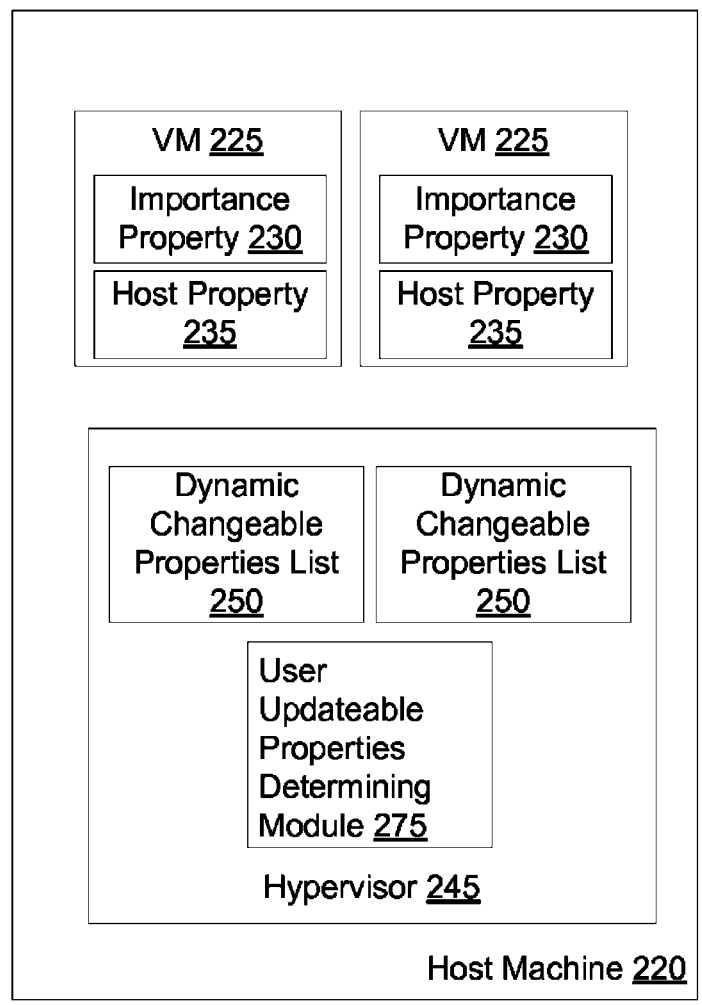
FIG. 2C is a block diagram illustrating one embodiment of a host machine that hosts one or more virtual machines.

FIG. 2C illustrates one example of a host machine 220 that hosts virtual machines, in accordance with one embodiment of the present invention. Each of the virtual machines 225 is a business logic entity. The host machine 220 includes a hypervisor 245 (also known as a virtual machine monitor (VMM)), which emulates and exports a bare machine interface to higher level software. The hypervisor 145 presents to other software (i.e., "guest" software) the abstraction of one or more virtual machines (VMs) 225, which may provide the same or different abstractions to various guest software (e.g., guest operating system, guest applications, etc.). A virtual machine 225 is a business logic entity that includes a combination of guest software that uses an underlying emulation of a hardware machine (e.g., as provided by hypervisor 245). Virtual machines 225 can be, for example, hardware emulation, full virtualization, para-virtualization, and operating system-level virtualization virtual machines. Each virtual machine 225 includes a guest operating system (guest OS) that hosts one or more applications within the virtual machine.

In one embodiment, the hypervisor 245 includes a user updateable properties determining module 275 that generates a dynamic changeable properties list for the VMs 225 when the first VM is initiated. Thereafter, the same dynamic changeable properties list 250 may be used for all of the VMs 225. Alternatively, a different dynamic changeable properties list 250 may be generated for each VM 225.

In one embodiment, each VM 225 includes multiple writeable properties, which include an importance property 230 that indicates the importance of the VM 225 and a host property 235 that controls what host the virtual machine 225 runs on. Changing the host properties causes the VM 225 to be migrated to a new host machine. The host property may be a conditionally updateable property. In one embodiment, the importance property may have a high importance value or a low importance value. If the importance property has a high importance value, then host property 235 is not user updateable. If the importance property has a low importance value, then the host property is user updateable. Thus, if a VM has a high importance, then a user cannot manually migrate the VM between host machines.

Figure 3:
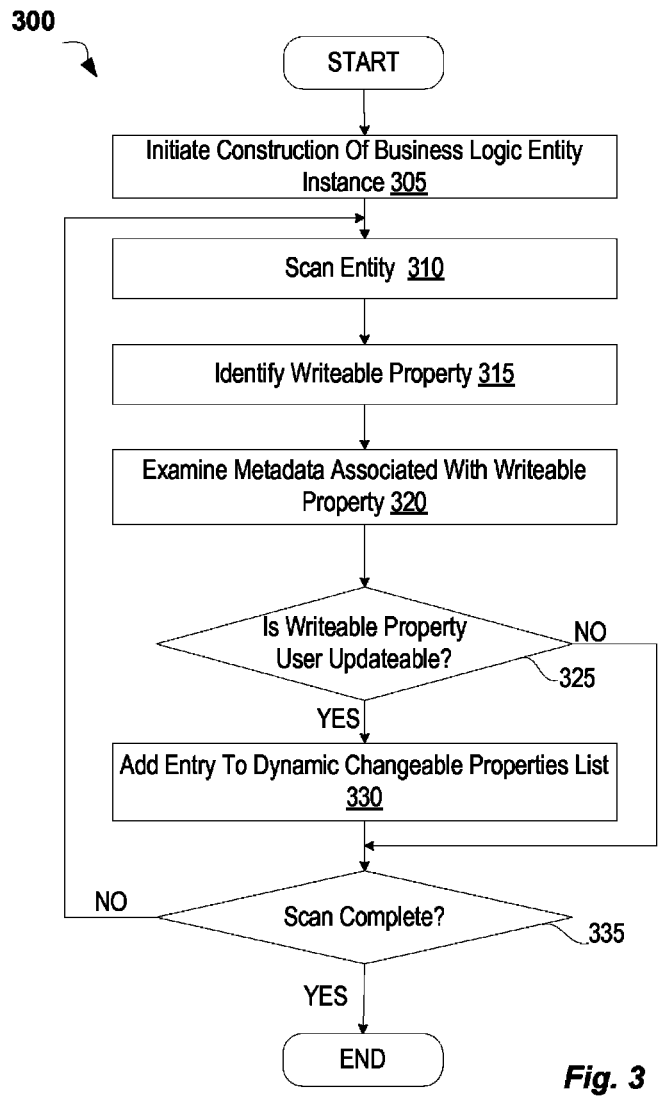
FIG. 3 is a flow diagram illustrating a method for one embodiment of generating a dynamic changeable properties list during an application's runtime.

FIG. 3 is a flow diagram illustrating a method 300 for one embodiment of generating a dynamic changeable properties list during an application's runtime. Method 300 may be performed by processing logic that may comprise hardware (e.g., circuitry, dedicated logic, programmable logic, microcode, etc.), software (such as instructions run on a processing device), or a combination thereof. Method 300 may be performed by an application, which may be, for example, a service (e.g., business logic) hosted by an application server, or by an application server that hosts such a service. In one embodiment, method 300 is performed by a user updatable properties determining module of the application or application server.

Referring to FIG. 3, at block 305 processing logic initiates construction of an instance of a business logic entity. The business logic entity may be a component of an application. The business logic entity may be constructed in response to a user requesting use of the business logic entity, in response to execution of the application, or based on some automated trigger (e.g., when an application is terminated).

At block 310, processing logic scans the business logic entity. In one embodiment, a user updateable properties determining module of the application scans the business logic entity using a reflection mechanism. In one embodiment, the reflection mechanism is provided by a library of a software framework in which the application runs. Alternatively, the reflection mechanism may be included in the application. The scan may include walking through the business logic entity (e.g., binary code of the business logic entity) to identify each writeable property included in the business logic entity. At block 315, processing logic identifies a writeable property. At block 320, processing logic examines metadata associated with the writeable property (if there is metadata associated with the writeable property). In one embodiment, the examined metadata is a custom attribute associated with the identified writeable property.

At block 325, the processing logic determines whether the writeable property is user updateable. This determination is made based on the examined metadata. In one embodiment, the examined metadata is a custom attribute (e.g., a .NET framework custom attribute) that includes a first value if the writeable property is user updateable and a second value if the writeable property is not user updateable. In another embodiment, the presence of the metadata (which may include a custom attribute) indicates that the writeable property is user updateable, and lack of the metadata indicates that the writeable property is not user updateable. In another embodiment, a writeable property may be conditionally user updateable. In this embodiment, if a particular condition is satisfied, then the writeable property is user updateable, and if the condition is not satisfied, then the writeable property is not user updateable. For example, a writeable property may be user updateable if a specific other writeable property has a particular value, if another writeable property is user updateable, etc.

If at block 325 the writeable property is user updateable, the method continues to block 330. If the writeable property is not user updateable, the method proceeds to block 335.

At block 330, processing logic adds an entry to a dynamic changeable properties list. The dynamic changeable properties list may start as an empty container that is automatically generated when the application is executed or when the business logic entity is generated. As user updateable properties are discovered (based on the metadata), entries are added to the dynamic changeable properties list until the entire business logic entity has been scanned, and entries have been added to the dynamic changeable properties list for all writeable properties that should be user updateable.

At block 335, processing logic determines whether the entire business logic entity has been scanned. If the entire business logic entity has not yet been scanned (e.g., there are still writeable properties that have not yet been examined to determine if they are user updateable), the method returns to block 310, and the scan continues. Otherwise, the method ends.

In one embodiment, method 300 is performed for the first instance of a business logic entity. When additional instances of the business logic entity are initiated, those additional instances use the already generated dynamic updateable properties list. Thus, only a single instance of the dynamic updateable properties list is maintained in memory, and all instances of the business logic entity point to a region in memory where that single dynamic changeable properties list is located.

Though method 300 is described with reference to creating a dynamic changeable properties list for a business logic entity, method 300 may also be performed to scan an application, and to generate a dynamic changeable properties list for the application. In such embodiments, the application may scan itself using a reflection mechanism.

Figure 4:
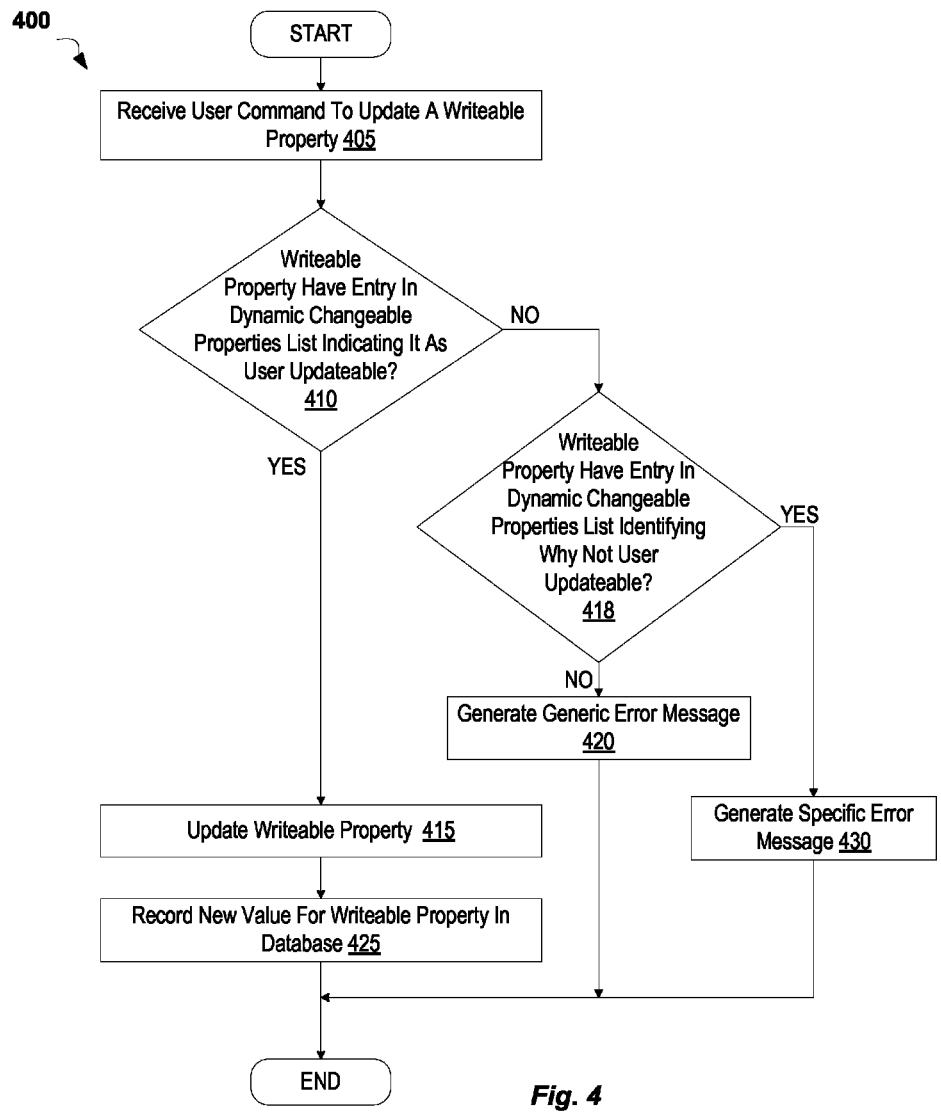
FIG. 4 illustrates a flow diagram illustrating a method for one embodiment of using a dynamic changeable properties list.

FIG. 4 is a flow diagram illustrating a method 400 for one embodiment of using a dynamic changeable properties list. Method 400 may be performed by processing logic that may comprise hardware (e.g., circuitry, dedicated logic, programmable logic, microcode, etc.), software (such as instructions run on a processing device), or a combination thereof. Method 400 may be performed by an application, which may be, for example, a service (e.g., business logic) hosted by an application server, or by an application server that hosts such a service. In one embodiment, method 400 is performed by a user updatable properties determining module of the application or application server.

Referring to FIG. 4, at block 405 processing logic receives a user command to update a writeable property. The command may be received by a client interface module of an application. At block 410, processing logic verifies whether there is an entry in a dynamic changeable properties list for the writeable property that distinguishes the writeable property as a user updateable property. In one embodiment, all entries in the dynamic writeable properties list are for user updateable properties. Therefore, if an entry is in the dynamic changeable properties list, then it is a user updatable property. In another embodiment, some entries in the dynamic updateable properties list are for user updateable properties and other entries in the dynamic updateable properties list are for writeable properties that are not user updateable. Entries that have a first value may reflect user updateable properties, which entries that have a second value may reflect writeable properties that are not user updateable. The verification may be performed by a user updateable properties determining module of the application. If there is no entry in the dynamic changeable properties list, or if there is an entry that identifies the writeable property as not being user updateable, then users are not permitted to modify the writeable property. Thus, the method continues to block 418. Alternatively, the method may continue directly to block 420 if only generic error messages are used. If there is an entry in the dynamic changeable properties list for the writeable property, then users are permitted to modify the writeable property. In this case, the method continues to block 415.

At block 415, processing logic updates the writeable property. At block 425, processing logic records a new value for the writeable property in a data store. In one embodiment, a data store interaction module of the application records the value in the data store.

At block 418, processing logic determines whether the writeable property has an entry in the dynamic updateable properties list that identifies why the writeable property is not user updateable. If the dynamic updateable properties list includes such an entry, the method continues to block 430, and data included in the entry is used to generate a specific error message. The specific error message may provide an explanation as to why the writeable property is not user updateable. If the dynamic updateable properties list does not include an entry that identifies why the writeable property is not user updateable, the method continues to block 420, and processing logic generates a generic error message. The method then ends.

Figure 5:
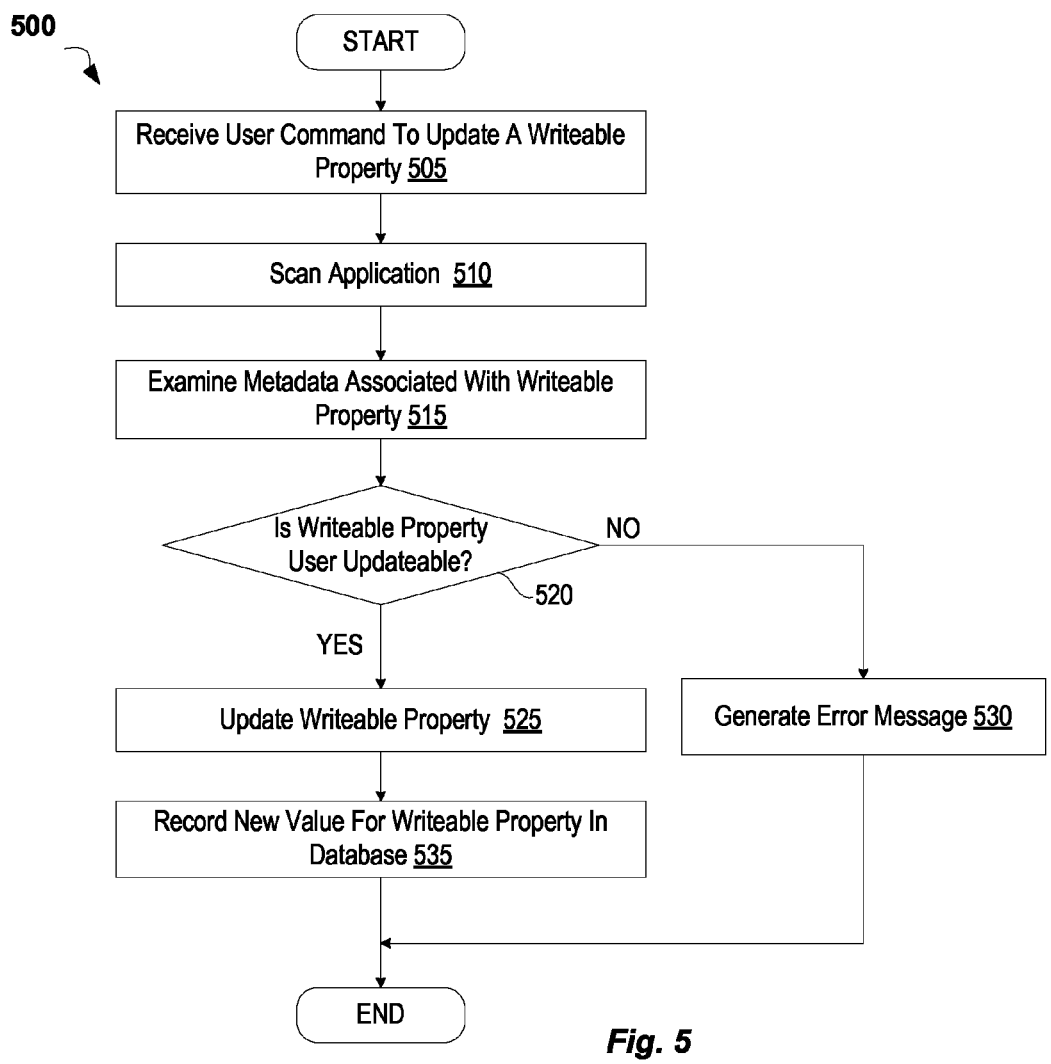
FIG. 5 illustrates a flow diagram illustrating a method for one embodiment of determining during an application's runtime whether a writeable property of the application is a user updateable property.

FIG. 5 illustrates a flow diagram illustrating a method 500 for one embodiment of determining, during an application's runtime, whether a writeable property of the application (or of a business logic entity managed by the application) is a user updateable property. Method 500 may be performed by processing logic that may comprise hardware (e.g., circuitry, dedicated logic, programmable logic, microcode, etc.), software (such as instructions run on a processing device), or a combination thereof. Method 500 may be performed by an application, which may be, for example, a service (e.g., business logic) hosted by an application server, or by an application server that hosts such a service. In one embodiment, method 500 is performed by a user updatable properties determining module of the application or application server.

Referring to FIG. 5, at block 505 processing logic receives a user command to update a writeable property. The command may be received by a client interface module of an application. At block 510, processing logic scans the application (or the business logic entity). In one embodiment, a user updateable properties determining module of the application scans the application (or business logic entity) using a reflection mechanism. In one embodiment, the reflection mechanism is provided by a library of a software framework in which the application runs. Alternatively, the reflection mechanism may be included in the application (e.g., coded into the user updateable properties determining module). The scan may include walking through binary code of the application (or business logic entity) to identify the specified writeable property included in the application. At block 515, processing logic examines metadata associated with the writeable property (if there is metadata associated with the writeable property). In one embodiment, the examined metadata is a custom attribute associated with the identified writeable property.

At block 520, the processing logic determines whether the writeable property is user updateable. This determination is made based on the examined metadata. In one embodiment, the examined metadata is a custom attribute (e.g., a .NET framework custom attribute) that includes a first value if the writeable property is user updateable and a second value if the writeable property is not user updateable. In another embodiment, the presence of the metadata (which may include a custom attribute) indicates that the writeable property is user updateable, and lack of the metadata indicates that the writeable property is not user updateable. If the writeable property is user updateable, the method continues to block 525. If the writeable property is not user updateable, the method proceeds to block 530, and an error message is generated.

At block 525, processing logic updates the writeable property. At block 435, processing logic records a new value for the writeable property in a data store. In one embodiment, a data store interaction module of the application records the value in the data store. The method then ends.

Figure 6:
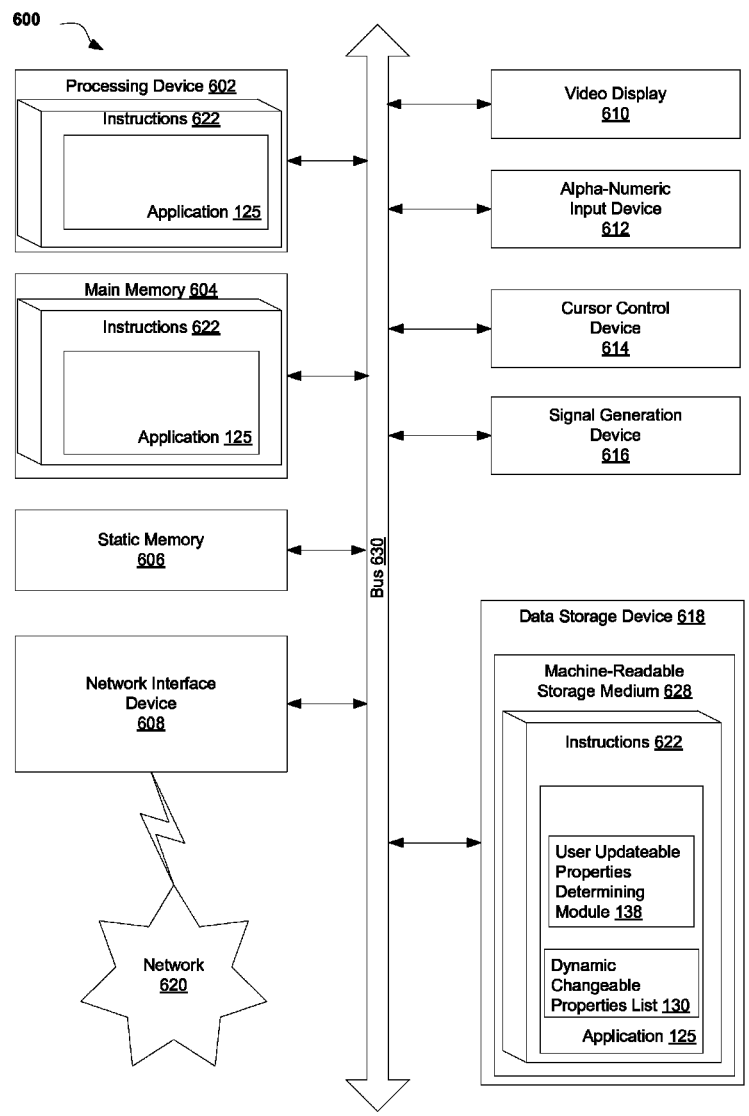
FIG. 6 illustrates a block diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic (e.g., instructions 622) for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 on which is stored one or more set of instructions 622 (e.g., software) embodying any one or more of the methodologies or functions described herein. The instructions 622 may also reside, completely or at least partially, within the main memory 604 and/or within the processing device 602 during execution thereof by the computer system 600; the main memory 604 and the processing device 602 also constituting machine-readable storage media.

The machine-readable storage medium 628 may also be used to store instructions for an application having a dynamic changeable properties list (e.g., application 125 of FIG. 1, which includes dynamic changeable properties list 130 and/or user updateable properties determining module 138) and/or a software library containing methods that call the application having the dynamic changeable properties list and/or user updateable properties determining module. While the machine-readable storage medium 628 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
    responsive to execution of an application on a processing device, identifying, by the processing device, writeable properties of a business logic entity associated with the application;
    for each writeable property, examining metadata associated with the writeable property, and determining whether the writeable property is a user updatable property based on the associated metadata; and
    adding, by the processing device, an entry to a changeable properties list for each writeable property that is a user updatable property.

2. The method of claim 1, further comprising:
    receiving, by the processing device, a user command to update a specified writeable property;
    determining, by the processing device, whether the specified writeable property has metadata that distinguishes the specified writeable property as a user updateable property based at least in part on the changeable properties list; and
    if the specified writeable property has the metadata that distinguishes the specified writeable property as a user updateable property, updating the specified writeable property in accordance with the user command.

3. The method of claim 2, wherein determining whether the specified writeable property has metadata that distinguishes the specified writeable property as a user updateable property comprises determining whether the specified writeable property has an entry in the changeable properties list, the method further comprising:
    if there is an entry for the specified writeable property in the changeable properties list, updating the specified writeable property in accordance with the user command.

4. The method of claim 3, further comprising:
if there is no entry for the specified writeable property in the changeable properties list, generating an error.

5. The method of claim 2, wherein updating the specified writeable property comprises recording a new value for the specified writeable property in a data store.

6. The method of claim 2, further comprising:
determining that the writeable property has metadata that distinguishes the writeable property as a conditionally updateable property;
determining whether a condition identified in the metadata is satisfied; and
if the condition is satisfied, updating the specified writeable property in accordance with the user command.

7. The method of claim 2, wherein the determining comprises using reflection by the application to identify the metadata.

8. The method of claim 1, wherein the examined metadata is a .NET framework based custom attribute.

9. A non-transitory computer readable storage medium including instructions that, when executed by a processing device, cause the processing device to perform operations comprising:
responsive to execution of an application on a processing device, identifying, by the processing device, writeable properties of a business logic entity associated with the application;
for each writeable property, examining metadata associated with the writeable property, and determining whether the writeable property is a user updatable property based on the associated metadata; and
adding, by the processing device, an entry to a changeable properties list for each writeable property that is a user updatable property.

10. The non-transitory computer readable storage medium of claim 9, the operations further comprising:
receiving, by the processing device, a user command to update a specified writeable property;
determining, by the processing device, whether the specified writeable property has metadata that distinguishes the specified writeable property as a user updateable property based at least in part on the changeable properties list; and
if the specified writeable property has the metadata that distinguishes the specified writeable property as a user updateable property, updating the specified writeable property in accordance with the user command.

11. The non-transitory computer readable storage medium of claim 10, wherein the determining comprises using reflection by the application to identify the metadata.

12. The non-transitory computer readable storage medium of claim 10, wherein determining whether the specified writeable property has metadata that distinguishes the specified writeable property as a user updateable property comprises determining whether the specified writeable property has an entry in the changeable properties list, the operations further comprising:
if there is an entry for the specified writeable property in the changeable properties list, updating the specified writeable property in accordance with the user command.

13. The non-transitory computer readable storage medium of claim 12, the operations further comprising:
if there is no entry for the specified writeable property in the changeable properties list, generating an error.

14. The non-transitory computer readable storage medium of claim 10, wherein updating the specified writeable property includes recording a new value for the specified writeable property in a data store.

15. The non-transitory computer readable storage medium of claim 10, the operations further comprising:
determining that the writeable property has metadata that distinguishes the writeable property as a conditionally updateable property;
determining whether a condition identified in the metadata is satisfied; and
if the condition is satisfied, updating the specified writeable property in accordance with the user command.

16. A computing apparatus comprising:
a memory to store instructions for a user updateable properties determining module; and
a processing device, coupled to the memory, to execute the instructions, wherein the instructions cause the processing device to:
responsive to execution of an application on the processing device, identify writeable properties of a business logic entity associated with the application;
for each writeable property, examine metadata associated with the writeable property, and determine whether the writeable property is a user updatable property based on the associated metadata; and
add an entry to a changeable properties list for each writeable property that is a user updatable property.

17. The computing apparatus of claim 16, wherein the instructions further cause the processing device to:
receive a user command to update a specified writeable property;
determine whether the specified writeable property has metadata that distinguishes the specified writeable property as a user updateable property based at least in part on the changeable properties list; and
update the specified writeable property in accordance with the user command if the specified writeable property has the metadata that distinguishes the specified writeable property as a user updateable property.

18. The computing apparatus of claim 17, wherein determining whether the specified writeable property has metadata that distinguishes the specified writeable property as a user updateable property comprises determining whether the specified writeable property has an entry in the changeable properties list, wherein the instructions to further cause the processing device to:
if there is an entry for the specified writeable property in the changeable properties list, update the specified writeable property in accordance with the user command.

19. The computing apparatus of claim 17, further comprising the instructions to cause the processing device to:
determine that the writeable property has metadata that distinguishes the writeable property as a conditionally updateable property;
determine whether a condition identified in the metadata is satisfied; and
if the condition is satisfied, update the specified writeable property in accordance with the user command.

20. The computing apparatus of claim 17, wherein the processing device uses reflection to identify the metadata.

\* \* \* \* \*